US009413521B2

(12) United States Patent
Poulsen et al.

(10) Patent No.: US 9,413,521 B2
(45) Date of Patent: *Aug. 9, 2016

(54) PROGRAMMABLE OPTICAL SUBASSEMBLIES AND MODULES

(71) Applicant: O.E. Solutions America, Inc., Englewood Cliffs, NJ (US)

(72) Inventors: Henrik N. Poulsen, Santa Barbara, CA (US); Daniel Jacob Blumenthal, Santa Barbara, CA (US)

(73) Assignee: OE SOLUTIONS AMERICA, INC., Englewood Cliffs, NJ (US)

(*) Notice: Subject to any disclaimer, the term of this patent is extended or adjusted under 35 U.S.C. 154(b) by 58 days.

This patent is subject to a terminal disclaimer.

(21) Appl. No.: 14/171,480

(22) Filed: Feb. 3, 2014

(65) Prior Publication Data

US 2014/0147130 A1    May 29, 2014

Related U.S. Application Data

(63) Continuation of application No. 12/945,264, filed on Nov. 12, 2010, now Pat. No. 8,644,713.

(60) Provisional application No. 61/281,156, filed on Nov. 12, 2009, provisional application No. 61/281,157, filed on Nov. 12, 2009.

(51) Int. Cl.
| | |
|---|---|
| *H04B 10/00* | (2013.01) |
| *H04L 7/00* | (2006.01) |
| *H04B 10/40* | (2013.01) |
| *H04B 10/80* | (2013.01) |
| *H04L 7/027* | (2006.01) |
| *H04B 10/079* | (2013.01) |
| *H04L 29/06* | (2006.01) |

(52) U.S. Cl.
CPC .............. *H04L 7/0075* (2013.01); *H04B 10/40* (2013.01); *H04B 10/801* (2013.01); *H04L 7/027* (2013.01); *H04B 10/0793* (2013.01); *H04L 7/0083* (2013.01); *H04L 65/1069* (2013.01)

(58) Field of Classification Search
CPC ........................... H04L 7/0075; H04L 7/0083
See application file for complete search history.

(56) References Cited

U.S. PATENT DOCUMENTS

| | | | |
|---|---|---|---|
| 6,647,010 B1 | 11/2003 | Ford et al. | |
| 6,665,498 B1* | 12/2003 | Jiang | H04B 10/801 398/135 |
| 7,174,098 B2* | 2/2007 | Yokoyama | H04B 10/07951 385/24 |

(Continued)

FOREIGN PATENT DOCUMENTS

WO    2011060325    5/2011

OTHER PUBLICATIONS

International Search Report, PCT/US10/56618.

*Primary Examiner* — Ken N Vanderpuye
*Assistant Examiner* — Amritbir Sandhu
(74) *Attorney, Agent, or Firm* — Karish & Bjorgum, PC; Kristin C. Hiibner

(57) ABSTRACT

An optical receiver, transmitter, transceiver or transponder for bursty, framed or continuous data. The optical receiver includes a burst mode clock recovery module that recovers the clock rapidly and with a small number of preamble or overhead bits at the front end of the data. A local clock is used for timing when the recovered clock is not available. Transitions between the recovered clock and local clock are smoothed out to avoid undesirable artifacts.

15 Claims, 7 Drawing Sheets

(56) References Cited

U.S. PATENT DOCUMENTS

| | | | |
|---|---|---|---|
| 7,486,894 B2* | 2/2009 | Aronson | H04B 10/40 398/128 |
| 8,243,869 B2* | 8/2012 | Dvir et al. | 375/376 |
| 8,644,713 B2* | 2/2014 | Poulsen | H04B 10/801 398/154 |
| 2002/0027689 A1 | 3/2002 | Bartur et al. | |
| 2003/0172240 A1 | 9/2003 | Johnson | |
| 2004/0101311 A1* | 5/2004 | Grohn | H04B 10/0771 398/154 |
| 2005/0220240 A1* | 10/2005 | Lesso | 375/372 |
| 2005/0226634 A1 | 10/2005 | Kuwata | |
| 2006/0093372 A1* | 5/2006 | Hahin | H04B 10/50 398/135 |
| 2007/0001530 A1* | 1/2007 | Lin | H02K 5/1735 310/90 |
| 2007/0253454 A1* | 11/2007 | Gustavson | H01S 5/06213 372/38.07 |
| 2008/0022143 A1* | 1/2008 | Scouten | H03L 7/0807 713/400 |
| 2008/0211428 A1 | 9/2008 | Bayat et al. | |
| 2008/0211482 A1* | 9/2008 | Fawley | 324/76.52 |
| 2008/0212716 A1 | 9/2008 | Miremadi et al. | |
| 2008/0292322 A1* | 11/2008 | Daghighian | H04B 10/40 398/192 |
| 2008/0304527 A1* | 12/2008 | Gao | H01S 5/06808 372/38.02 |
| 2009/0041469 A1 | 2/2009 | Hofmeister et al. | |
| 2009/0060107 A1* | 3/2009 | Fischer | H04L 7/08 375/355 |
| 2009/0060531 A1 | 3/2009 | Biegert et al. | |
| 2009/0083755 A1* | 3/2009 | Luo | G06F 9/4881 718/108 |
| 2009/0103926 A1* | 4/2009 | Hotchkiss | H04L 1/0057 398/135 |
| 2009/0154932 A1* | 6/2009 | Hinderthuer | H04Q 11/0005 398/98 |
| 2009/0279889 A1* | 11/2009 | Kirkpatrick | H04B 10/25752 398/41 |
| 2010/0095110 A1* | 4/2010 | Noble | H04L 9/0891 713/153 |
| 2010/0135666 A1 | 6/2010 | Kim et al. | |
| 2010/0142881 A1* | 6/2010 | Vernooy | G02B 6/138 385/14 |
| 2010/0232558 A1* | 9/2010 | Terada | H03L 7/0805 375/374 |
| 2010/0254711 A1* | 10/2010 | Miller | H03F 3/087 398/136 |
| 2011/0001530 A1* | 1/2011 | Nishi | H04L 7/033 327/162 |
| 2011/0025913 A1* | 2/2011 | Sugiyama | H03L 7/0807 348/500 |
| 2011/0064417 A1* | 3/2011 | Sato | H04B 10/40 398/135 |
| 2011/0098015 A1* | 4/2011 | Goodwin | H04W 52/0216 455/334 |
| 2011/0116792 A1 | 5/2011 | Blumenthal et al. | |
| 2011/0116810 A1* | 5/2011 | Poulsen | H04B 10/801 398/202 |
| 2011/0135312 A1* | 6/2011 | El-Ahmadi | H04L 1/0057 398/135 |
| 2012/0148236 A1* | 6/2012 | Kumar | H04J 3/14 398/34 |
| 2013/0076411 A1* | 3/2013 | Sato | H03L 7/0807 327/155 |
| 2015/0125158 A1* | 5/2015 | El-Ahmadi | H04L 1/0057 398/135 |
| 2015/0280901 A1* | 10/2015 | Hafuka | H04L 7/027 375/355 |

\* cited by examiner

PROGRAMMABLE OPTICAL SUBASSEMBLIES AND MODULES

CROSS-REFERENCE TO RELATED APPLICATION(S)

This application is a continuation of U.S. Pat. No. 8,644,713, titled "Optical Burst Mode Clock and Data Recovery" filed Nov. 12, 2010, and claims priority under 35 U.S.C. §119(e) to U.S. Provisional Patent Application Ser. No. 61/281,557, "Optical Burst Mode Clock and Data Recovery Method and Apparatus for Optical Transceivers," filed Nov. 12, 2009 and to U.S. Provisional Patent Application Ser. No. 61/281,156, "Burst Mode Optical Transceivers with Embedded Electronic Application Specific Circuits (Asics) and Application Specific Optics," filed Nov. 12, 2009. The subject matter of all of the foregoing is incorporated herein by reference in their entirety.

BACKGROUND OF THE INVENTION

1. Field of the Invention

This invention relates generally to fiber optic receivers and transceivers and transponders, and in particular to an optical line-side with burst mode receiver and clock and data recovery and burst mode transmitter.

2. Description of the Related Art

Today's fiber optic based networks use transceivers or transponders at the interface between electronics and the optical signals that propagate on the optical fiber. A transceiver or transponder contains within it the basic elements of an optical transmitter, an optical receiver, and other electronics to perform clock and data recovery and physical layer protocol functions as well as functions to control these components. There are many applications for transceivers ranging from fiber to the home to data centers to long haul and high-performance communications. The performance of the transceiver or transponder as well as its cost is tied to the particular application. Today, transceivers are manufactured in a form factor called a pluggable like an XFP or SFP package, or as a board mountable component.

Typical transceivers are designed for use with protocols (e.g. SONET, SDH, FDDI, Gigabit Ethernet, Ethernet, Fiber Channel) in which the incoming data is well behaved, continuous and not bursty. In these transceivers, the receivers are designed to extract both the clock and data from an incoming optical signal that is continuous and typically cannot handle burst mode or unframed packet modes of transmission and reception. In conventional applications, the incoming data stream is continuous so it is acceptable for the clock and data recovery (CDR) module to take a long time to recover the clock. For example, the CDR design may be based on a phase-locked loop that takes some time to acquire phase lock. In these cases, if the CDR takes a long time to lock the clock, then it typically will also be a long time before the CDR loses the lock.

However, new burst mode applications may have packets that can consist of short packets, long packets or wide ranges of packet or burst lengths with unknown or non-determined inter packet or inter burst spacing. This new burst environment will require locking of the clock in a much shorter time, for example within approximately 32 bits or less. Typically, a CDR that is fast enough to lock the clock within 32 bits will also lose lock if the incoming signal is lost (or is no longer present) after 32 bits. For bursty, asynchronous traffic, this may happen quite often. It should be noted that the same hardware designed for burst mode operation can often also be used for framed, continuous or other types of data protocols and transport.

This mode of operation is not possible with current technology since conventional framed protocols trade off synchronous operation for clock lock time and clock hold time. As an example of a bursty-traffic environment, the communication system might use variable length, asynchronous packets with small overhead (e.g., short preambles) for clock and data recovery. The arrival time and optical power of the packets or bursts can be random and vary per packet or per burst. In conventional transceivers, stringent requirements are imposed onto the receiver electronics, and in particular on the CDR, when synchronous protocols such as SONET, SDH and Gigabit Ethernet are used. These protocols with synchronous clocked data typically require on the order of a couple of thousand transitions to lock, which at 10 Gbps in general means a couple of milliseconds.

Thus, there is a need for optical receivers that can more quickly lock onto a clock and hold that clock for a sufficient period of time, for example to accommodate bursty and/or asynchronous traffic.

SUMMARY OF THE INVENTION

Embodiments of the invention overcome various limitations of the prior art by providing clock and data recovery that is based on a synthesized clock. The synthesized clock is created by smoothly combining a clock recovered from incoming data and a local clock of approximately the same frequency.

In one approach, the recovered clock is used when it is available. However, bursty data means that data will not always be present and, therefore, the recovered clock will not always be present. If the recovered clock is not present, then a local clock of approximately the same frequency is used. Transitions between the recovered clock and local clock are smoothed out to avoid undesirable artifacts.

Other aspects of the invention include methods corresponding to the devices and systems described above, and receivers, transmitters, transceivers and transponders utilizing these approaches.

BRIEF DESCRIPTION OF THE DRAWINGS

The invention has other advantages and features which will be more readily apparent from the following detailed description of the invention and the appended claims, when taken in conjunction with the accompanying drawings, in which:

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1A:
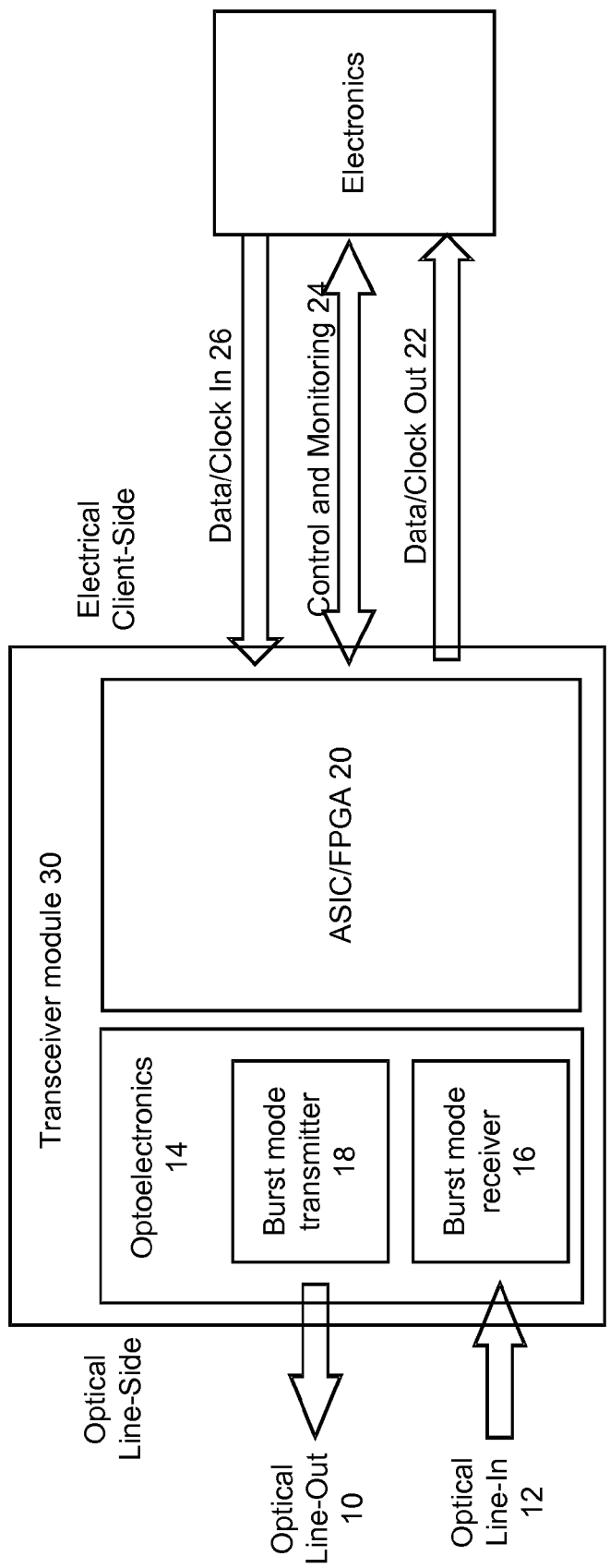
FIG. 1A is a block diagram of a transceiver that includes a burst mode receiver.

FIG. 1A is a block diagram of a transceiver that includes a burst mode receiver. Aspects of the invention will be described in the context of a transceiver, but they apply also to receivers, transponders and transmitters. The transceiver module 30 includes optoelectronics 14 and electronic circuitry 20. The optoelectronics 14 include an optoelectronic or optical transmitter 18 and an optoelectronic or optical receiver 16. The transmitter 18 and receiver 16 communicate with the optical data input 12 and optical data output 10 (i.e., the optical line-side). The electrical interface, including electrical data input 26 and electrical data output 22 will be referred to as the electrical client-side. The receive data path is from optical line-in 12 through burst mode receiver 16 to electrical data-out 22. The transmit data path is from electrical data-in 26 through burst mode transmitter 18 to optical line-out 10. In this example, both the transmitter 18 and receiver 16 can operate in burst-mode for clock and data recovery on the optical line-side. It should be understood that the principles described herein can be applied to transmitters, receivers and/or transceivers. All electronic functions for all possible applications, all protocols, and all application specific optics that are connected to the electronics are embedded in a single FPGA/ASIC (20) or FPGAs/ASICs (20). By leveraging the large volume across a broad number of application markets, the low cost of an ASIC will allow low cost transceiver modules that can not only support today's legacy protocols that are framed, but new protocols that are bursty that allow lower cost transmission and lower power operation of the transceivers and back end network electronics that use one chip set to support all application specific optics across a broad set of markets. The circuitry 20 incorporates electronic functions required for all possible application specific optoelectronic 14 embodiments and all possible electrical-client side 28 communications and control. This approach is used in order to reduce the cost of today's expensive electronics used in optical transceivers by utilizing a common circuit 20 or set of circuits 20. The circuitry 20 serves as a common electronic engine that is used for all possible optical and communications applications, leading to high volume and low cost electronics with burst mode and continuous/framed, protocol and data transport operation. The electrical client data or data/clock 26 communicates with circuits in 20 via an electrical line-side burst mode transmitter and receiver and client side burst mode receiver. The user supplies data on the client side. Integration of the client side burst mode receiver enables the customer to migrate to a low cost customer interface that eliminates costly Phy chip sets. The control and monitoring channel 24 of the client side communicates with circuits in the electrical ASIC/FPGA 20 dedicated to all control and monitoring aspects of the transmission and receiving functions. The recovered burst mode transceiver data/clock 22 is communicated from the electrical ASIC/FPGA to the client via circuits in the electrical ASIC/FPGA 20.

The burst-mode capabilities of receiver 16 and transmitter 18 allow optical data (i.e., data transmitted in optical form) to be input and output to/from the optical line-side in a true burst, true packet, continuous or framed mode. One example of burst mode is when the arrival time and duration of data on the communications link is fairly unpredictable. The term covers pure packet transmission as well as other variations of burst mode transmission, making the design of the transmitter 18 and receiver 16 as well as the corresponding signal processing and control electronics generally more difficult and expensive to design and implement compared to conventional transmitters and receivers that can rely on a continuous data stream.

Figure 1B:
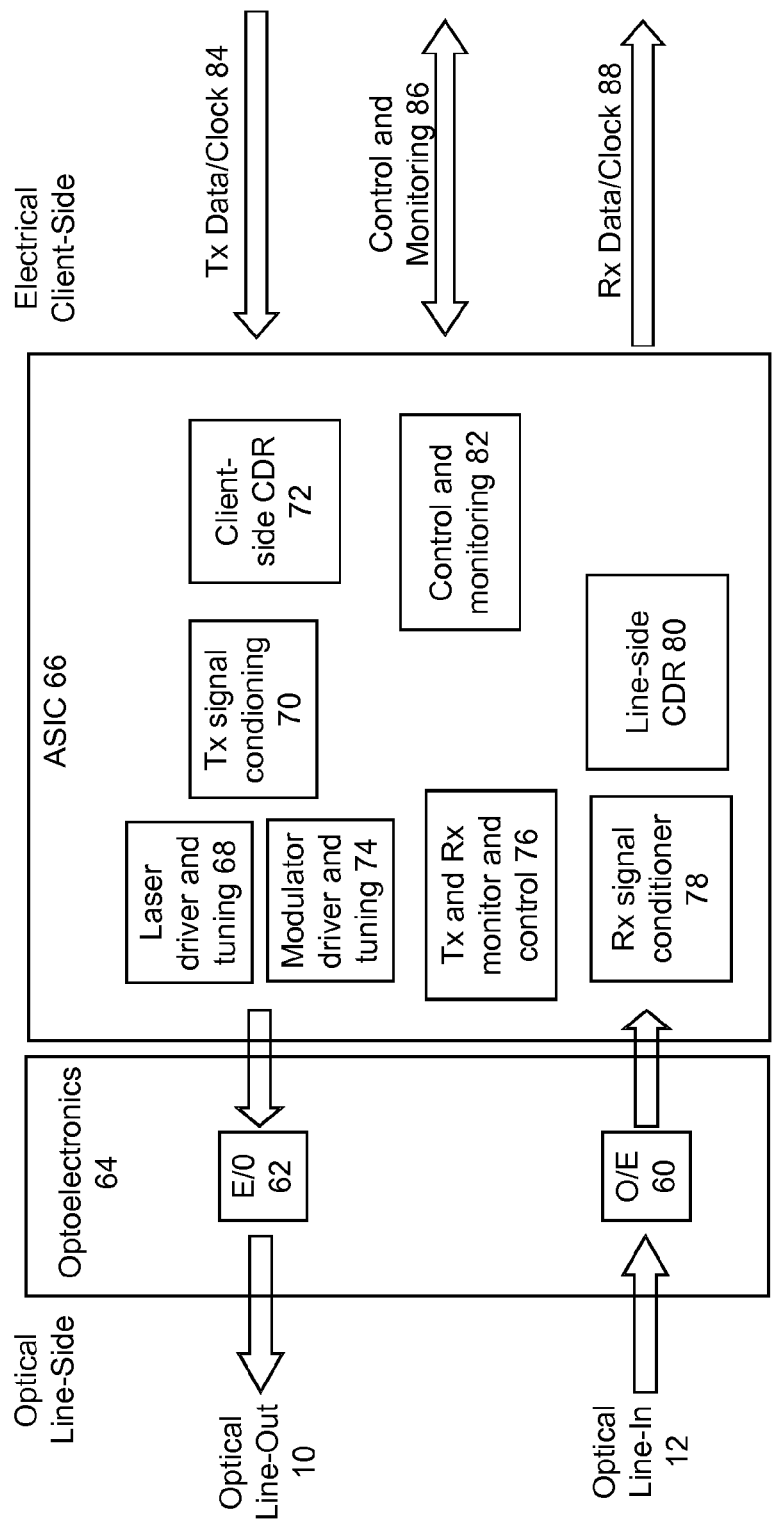
FIG. 1B is a more detailed block diagram of the transceiver in FIG. 1A.

FIG. 1B is a more detailed block diagram of the transceiver in FIG. 1A. It should be understood that not all of the components shown in FIGS. 1A and 1B are required for every implementation.

The electrical ASIC/FPGA 66 includes electronic circuits to burst mode transmit, burst mode receive, monitor and recover clock and data. The electrical laser driver and tuning sections 68 support drive of laser(s), including but not limited to multisection tunable lasers, fixed wavelength lasers, direct drive lasers and externally modulated lasers, preferably for both burst mode and continuous non-burst mode operation. The modulator drive and tuning circuits 74 include circuits capable of supporting multiple modulator types including but not limited to electro-absorption modulators (EAMs), Mach-Zehnder (MZ) modulator(s) and direct drive lasers. The transmitter and receiver monitor and control circuit sections 76 monitor various parameters of the transmitter and receiver, including possibly average power, peak power, burst duty cycle, wavelength, average and peak currents for the lasers, average and peak currents for modulator bias circuits, wavelength and power calibration. The post amplifier and signal conditioner sections 78 include circuits to receive burst mode data, and the signal conditioner section 70 includes circuits to convert the client-side electrical data and clock into signals used to drive the laser and/or modulator circuits as required for burst mode transmission. The clock and data recovery circuits (CDR) on the client-side 72 and line-side 80 include circuits as described in more detail below, to extract clock and data with low overhead (e.g., short preamble) in a short amount of time and with a large dynamic range in packet or burst level electrical or optical and in packet or burst interspacing or arrival rate. The client-side electronics communicate data 84 to the client-side CDR circuits 72 and the recovered clock and data from 80 are delivered to the client as received data and clock in the required signal level 88. Control and monitoring of the electronic ASIC circuits and the optoelectronics/optics and delivery of control and monitoring signals 86 via the client are handled by the FPGA and control and monitoring logic 82.

The optoelectronics 64 includes an E/O converter 62 and an O/E converter 60. The E/O converter 62 may include lasers and modulators. The O/E converter 60 may include photodetectors.

Figure 2:
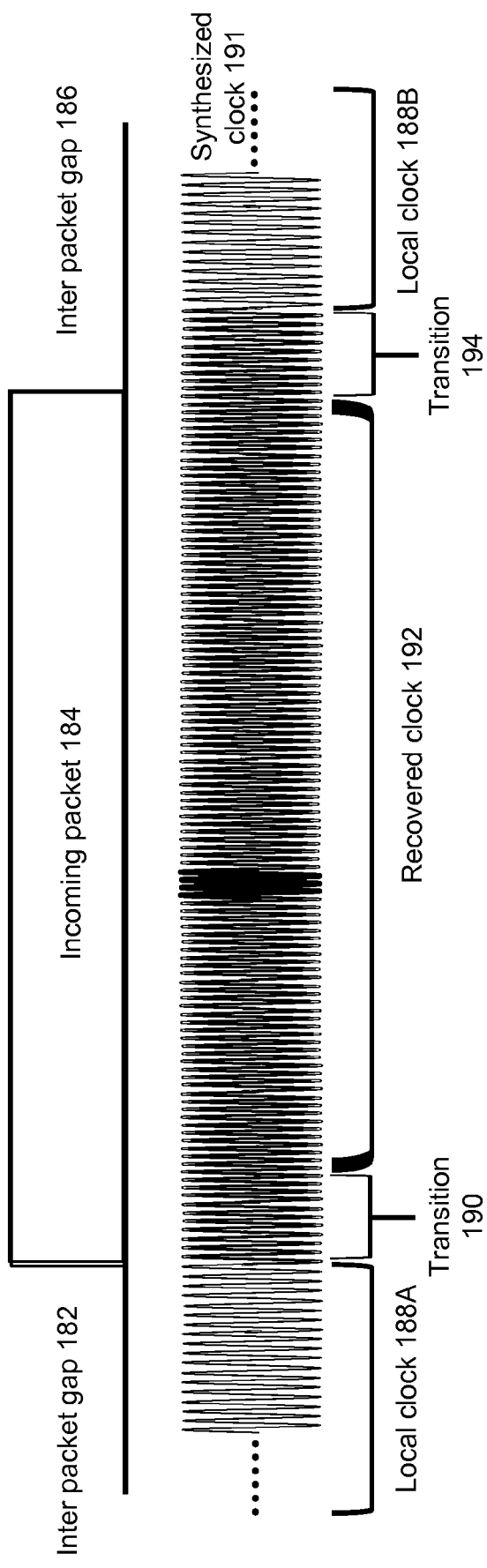
FIG. 2 illustrates clocking for burst mode transmission.
Figure 3:
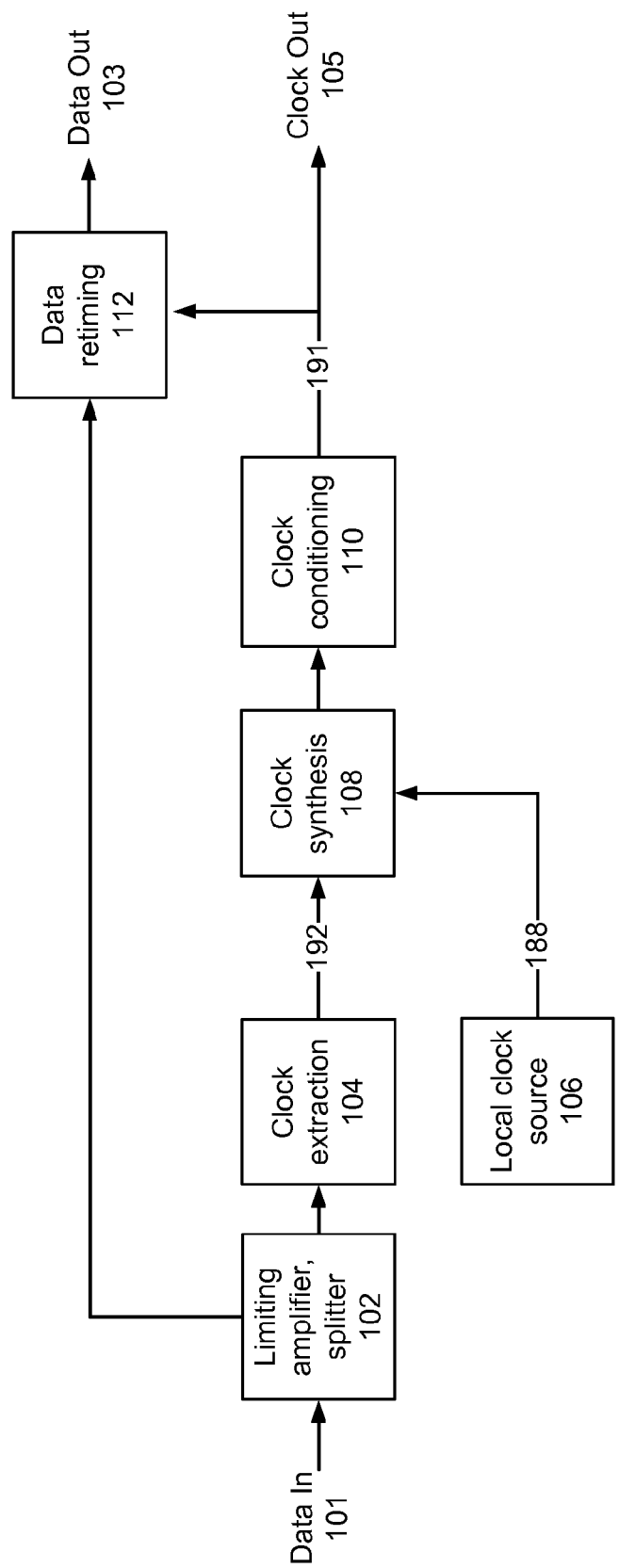
FIG. 3 is a functional block diagram of one embodiment of a burst mode CDR according to the invention.

FIGS. 2 and 3 illustrate clock and data recovery for an incoming bursty packet. As shown in FIG. 2, the incoming packet 184 may be relatively short with a correspondingly short preamble. The arrival time may also be unpredictable, and packet 184 may not be synchronized to a global clock, system clock or to earlier or later received packets.

FIG. 3 is a functional block diagram of one embodiment of a burst mode CDR. In FIG. 3, the incoming packet (or other incoming data transmission) 184 arrives at an input port 101 for the CDR. The incoming data received at input port 101 is in electrical form and is derived from the originally received optical data. The CDR module recovers the data which is made available on output port 103. The CDR also recovers a clock 191 corresponding to the data, and this clock is available on output port 105. This clock will be referred to as the synthesized clock 191.

If the data transmission were continuous, a stable, long-term clock could be recovered solely from the incoming data stream. However, this is difficult for bursty data. As shown in FIG. 2, packet 184 exists only for a very finite period of time. A clock 192 recovered from that data would also exist only for a very finite period of time. No clock can be recovered from the data stream after the data stream ends. Unfortunately, the clock typically must exist for a longer period of time in order to adequately process the incoming data. For example, the incoming data may be clocked into a FIFO (and later clocked out by a separate system clock), and that process may extend beyond the end time of the packet, thus requiring a clock that exists beyond the end of packet 184. At the beginning of the packet, there is also some startup time before the recovered clock 192 can be locked, which further shortens the period when there is an available and useful recovered clock 192.

The CDR module in FIG. 3 addresses this by combining a local clock 188 with the recovered clock 192 to produce the synthesized clock 191. The local clock 188 is approximately the same frequency as the recovered clock 192 and the CDR module makes smooth transitions between the recovered clock 192 and local clock 188.

As a specific example, the FPGA/ASIC includes an elastic FIFO dual port FIFO used to match incoming data that arrives in an asynchronous clock domain to the system clock domain. For each N data bits, M derived clock cycles are used until the data is loaded in the FIFO and can be processed using the system clock. As an example, using a 40 byte IP packet (320 bits at 10 Gbps), 320 clock cycles at 10 GHz are typically required to de-serialize the data. To latch data into the FIFO, another 320 clock cycles at 10 GHz are typically required. Typically, an additional 320 clock cycles or more are used in various processing stages from the deserializer to the elastic FIFO. Thus, for a 40-byte packet, 640-960 clock cycles at 10 GHz are required to ensure processing of the detected data transitions from the de-serializer to the dual port FIFO. For a packet switched system, this requirement would be an issue as the utilization would drop drastically as the above mentioned 40 byte packet would require an overhead of an additional 80 bytes.

The overhead can be reduced by latching the data at the deserializer following the CDR. However, the receiver still goes through the cycle of amplifying incoming signals to the correct levels and deriving the clock to latch the data into the deserializer. A 40 byte packet has a duration of 32 ns at 10 Gbps and additional overhead for CDR and amplitude equalization should therefore be limited to a few nanoseconds in order not to decrease traffic utilization significantly. For example, a preamble of 32 bits might be used, which corresponds to 3.2 ns at 10 Gbps and 10% of the length of a 40 byte packet.

To latch data into the deserializer, a clock that is synchronous to the packet data should be available for a time period that is at least equal to the length of the packet. That is, for a 40 byte long packet (320 bits), the synchronous clock should be available for 320 clock cycles. This clock and these clock cycles are used to latch data into the deserializer. In FIGS. 2 and 3, the recovered clock 192 is used for this purpose. The clock used to move data from the deserializer to the elastic FIFO does not have to be synchronous to the incoming packet. In FIGS. 2 and 3, the local clock 188 is used for this purpose. However, it is preferred that there are not any sharp phase or frequency shifts between these two clocks. Thus, there is a smooth transition between the clocks, as shown in FIG. 2.

The example design shown in FIG. 3 is now described in more detail. The incoming data stream is injected into the burst mode limiting amplifier and data split module 102. The purpose of this module is to increase input power dynamic range, ensure equal amplitude of all bursts at the output and split data into multiple paths. The input power dynamic range and the equal burst output amplitude is achieved by using high gain amplifying and clamping circuitry. The output is subsequently split. One part of the signal is sent to the data retiming module 112 and the other part to the clock extraction module 104.

The clock extraction module 104 extracts a clock signal from the incoming data and ensures equal amplitude over all clock cycles. To extract the clock from the incoming data, a narrowband frequency extraction circuit is used. It has a fixed or tunable bandpass filter around the expected center frequency. This results in a clock tone corresponding to the data rate and phase aligned with the data. However, due to the fast acquisition time of the circuitry, the amplitude of the clock will vary as a function of the data bit transition density. By applying a clamping function, the clock amplitude variation can be reduced and a consistent clock amplitude can be presented to the subsequent circuitry. The output of clock extraction module 104 is the recovered clock 192. The clock extraction module 104 locks onto the clock quickly but this usually means that it will also drop lock quickly.

The recovered clock 192 only has a clock tone present when data is present at the CDR input 101. When no data is present at the CDR input 101, then no recovered clock tone 192 is present either. However, to enable to clock data through the steps required to the continuous system clock domain, more clock cycles are required. The recovered clock 192 is therefore combined with a local clock 188 by clock combining module 108.

In this example, module 108 operates as follows. When data is present at the input 101, the recovered clock 192 is output from clock combiner 108. When no data is present, the local clock 188 is output from clock combiner 108. The local clock 188 is close in frequency to the recovered clock 192, but it need not be an exact match. In the transition period, the output of the clock combiner 108 is the phase and frequency mix of the recovered clock 192 and local clock 188.

The local clock 188 is generated in the local clock generation circuit 106. In this implementation, it is an injection locked type of clock oscillator that generates a clock close in frequency to that of the recovered clock 192. The clock could be free running (i.e., no seed clock) or it can be synchronized to a lower frequency system clock seed clock. In alternate embodiments, the local clock 188 could be provided by other sources, including sources located outside of the module.

The local clock 188 is matched to be close in frequency to that of the recovered clock 192, but it typically will not be an exact match. The frequency can be different up to a certain amount and the two clocks may be completely phase independent. Sharp transitions could therefore occur during transitions between the local clock 188 and the recovered clock 192. This is alleviated by the clock phase transition smoothing and amplitude equalization circuitry 110. This module 110 has three functions. It ensures no clock cycles are missing, it removes sharp clock phase transitions and, it ensures equal amplitude for all clock cycles. When a clock cycle is missing, the frequency content at the position in time will be lower compared to that in a continuous clock and by eliminating lower frequencies beyond that threshold, missing clock cycles are reinstated and a continuous clock is generated. Sharp clock phase transitions have a higher frequency content compared to the non-sharp phase transitions of a continuous clock and by removing the higher frequency content, phase transitions can be smoothed. Finally, varying amplitudes (e.g., caused by the clock combining in module 108) can be alleviated by amplifying and clamping so the resulting clock is a smooth continuous clock with constant amplitude.

The resulting smooth, continuous clock (i.e., the synthesized clock 191) is split. One part is sent to the clock output port 105. The other part is sent to a data retiming module 112. The data retiming module reduces jitter in the data signal and aligns incoming data with the synthesized clock 191 as well as reshaping the incoming data. The data out of the retiming module 112 is available at data output port 103 and is aligned with the synthesized clock 191 on clock output port 105.

Figure 4:
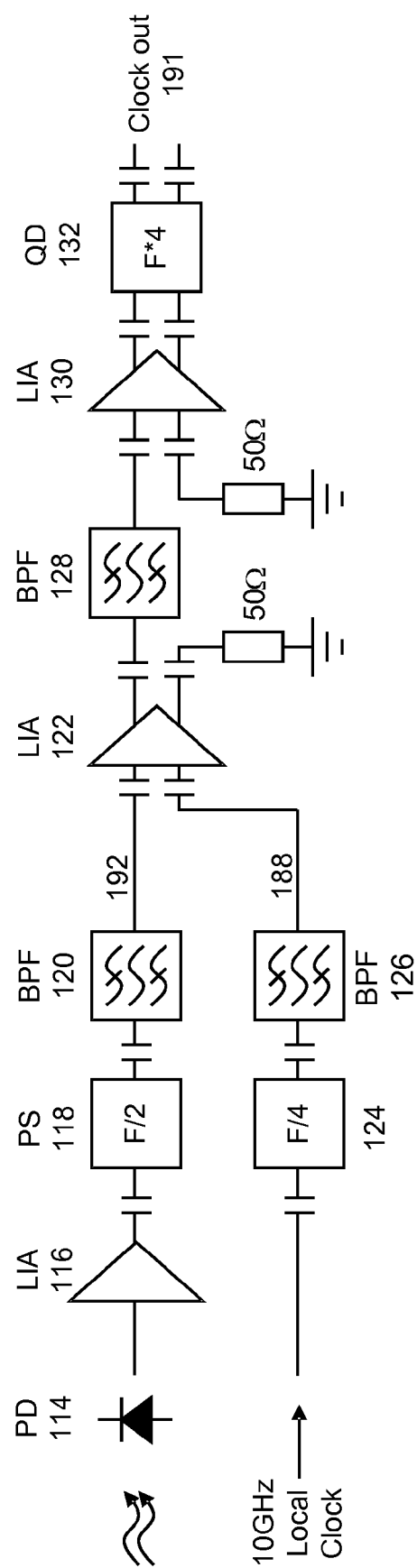
FIG. 4 is a circuit diagram of one implementation of a burst mode CDR according to the invention.

FIG. 4 is a circuit diagram of one implementation of a burst mode CDR module, based on the 10 Gbps example described above. Incoming 10 Gbps data from a photodetector 114 is amplified in a 10 Gbps limiting amplifier 116 to maximize optical input power dynamic range. This in itself can cause problems because limiting amplifiers are built with a gain control/loss of signal feedback loop. When data is not present, the amplifier is turned off so not to generate noise due to the high gain. Such control loops have bandwidths of the order of 1-100 MHz or a reaction time of 10-1000 ns and would therefore be too slow to be used in a packet switched system. Simply stated, if a 40 byte packet (which is 32 ns long) is detected after a lengthy idle time, the turn-on time for the amplifier 116 would be too long, turning on in the middle of the packet or later. In one approach, a small DC voltage is added to the inputs of the limiting amplifier, thereby preventing it from turning off.

In this embodiment, following the limiting amplifier is a prescaler functionality 118. Other embodiments to realize the same function are also possible. Conventional prescalers typically cannot be used because they require a continuous clock input and are not suitable for bursty date. Instead, a design with a flip-flop feeding input data to the clock input and the flip-flop data output connected to the flip-flop data input is utilized. Data at the output of the prescaler 118 has a data rate of 5 Gbps and as NRZ, contains a 2.5 GHz clock tone. It is this tone that is recovered. This is done using a 2.5 GHz narrow band bandpass filter 120, which filters out the 2.5 GHz clock tone 192. The following 2.5 GHz limiting amplifier 122 ensures that power fluctuations due to an unequal number of bit transitions per unit time are eliminated.

The limiting amplifier 122 used is differential. It has a positive and negative data input. The recovered clock 192 is fed to the positive clock input and will out of the filter have an amplitude of ~200 mV. To the negative input a local 2.5 GHz local clock 188 is applied, however, with an amplitude of ~10 mV, 20 times lower than that of the recovered clock 192. The local clock 188 is derived by first dividing an incoming 10 Gbps signal by frequency divider 124 and a filter 126 to ensure a clean clock signal 188.

When data is present, a clock signal is present at the positive input of the limiting amplifier and this will dominate the local clock 188 due to the amplitude difference, so the output clock 191 will be synchronous with the data input. This is used to latch data into the deserializer. When the end of the data packet is reached, data has been latched and the recovered clock 192 is no longer present. At this point the local clock 188 will take over and a continuous clock is now present to move data from the deserializer to the elastic FIFO. The local clock 188 will be matched to be fairly close in frequency to that of the recovered clock 192. However, the two clocks are not phase locked so there may be abrupt phase changes when transitioning between clocks. This is alleviated by narrowband bandpass filter 128 and limiting amplifier 130. At the output of amplifier 130, a continuous clock is present based on either the recovered or local clock, with significantly reduced phase shifts during the transitions between clocks. This clock is at 2.5 GHz and a differential quadrupler 132 is used to generate the required 10 GHz synthesized clock 191.

In an alternate embodiment, Colpitts injection locked oscillators can be used instead of bandpass filters. These can be integrated to form a very compact solution. By using combinations of flip-flops, prescalers and frequency multipliers at the input and output, the approach shown in FIG. 4 can be used for many applications, including data transmission from 622 Mbps to 40 Gbps. To obtain both data output and clock output, a crossbar switch can be used after the limiting amplifier 116. This has a differential output and both data and clock are now available, as illustrated in FIG. 8. All logic levels are CML in this example. While not shown, the integrated version could also feature a flip-flop in the data path, clocked by the recovered clock to ensure clock data synchronization.

Figure 5:
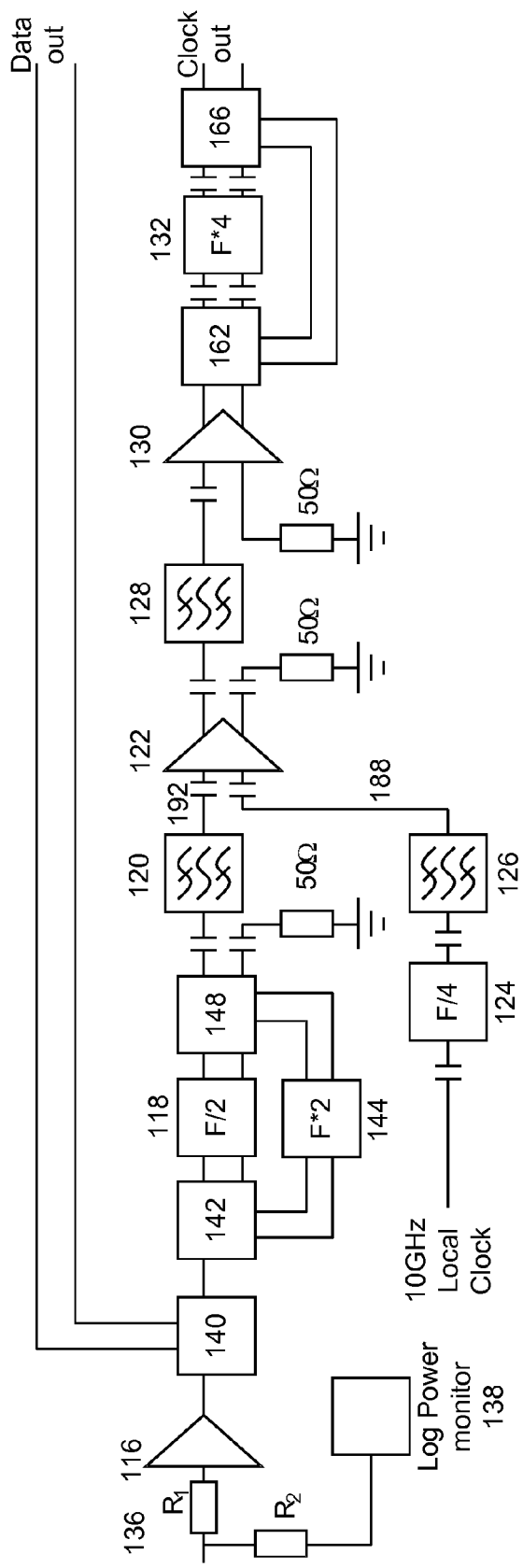
FIG. 5 is a circuit diagram of another implementation of a burst mode CDR according to the invention.

FIG. 5 is a circuit diagram of another implementation of a burst mode CDR according to the invention. This circuit is designed to handle both 2.5 Gbps and 10 Gbps operation. Much of the circuit in FIG. 5 operates similarly to the circuit in FIG. 4. What follows is a description of the differences. Incoming 2.5/10 Gbps data is sent to the CDR. At the input a resistive tap 136 taps a small amount of the incoming data to measure the input power using a log power monitor 138. The main part of the incoming signal is amplified in a 10 Gbps limiting amplifier 116 to maximize optical input power dynamic range. Following the limiting amplifier 116 is a crossbar switch 140, which here creates two copies of the input signal. One copy is the data output and the other is fed to the clock recovery circuit.

If the circuit is operating with 10 Gbps data, then the crossbar switches 142 and 148 select the data path through frequency divider circuit 118 to generate a 5 Gbps signal. If the circuit is operating with 2.5 Gbps data, then the crossbar switches 142 and 148 select the data path through the frequency doubler 144, also resulting in a 5 Gbps signal. The 2.5 GHz narrow band bandpass filter 120 filters out the 2.5 GHz clock tone 192.

After combining with the local clock 188, crossbars 162 and 166 again account for operation at either 2.5 Gbps or 10 Gbps. At 2.5 Gbps operation, the crossbars 162 and 166 select the data path that avoids the frequency quadrupler 132, thus keeping the synthesized clock 191 at 2.5 GHz. This example was designed for two input data rates, but it can be extended to handle more data rates.

Figure 6:
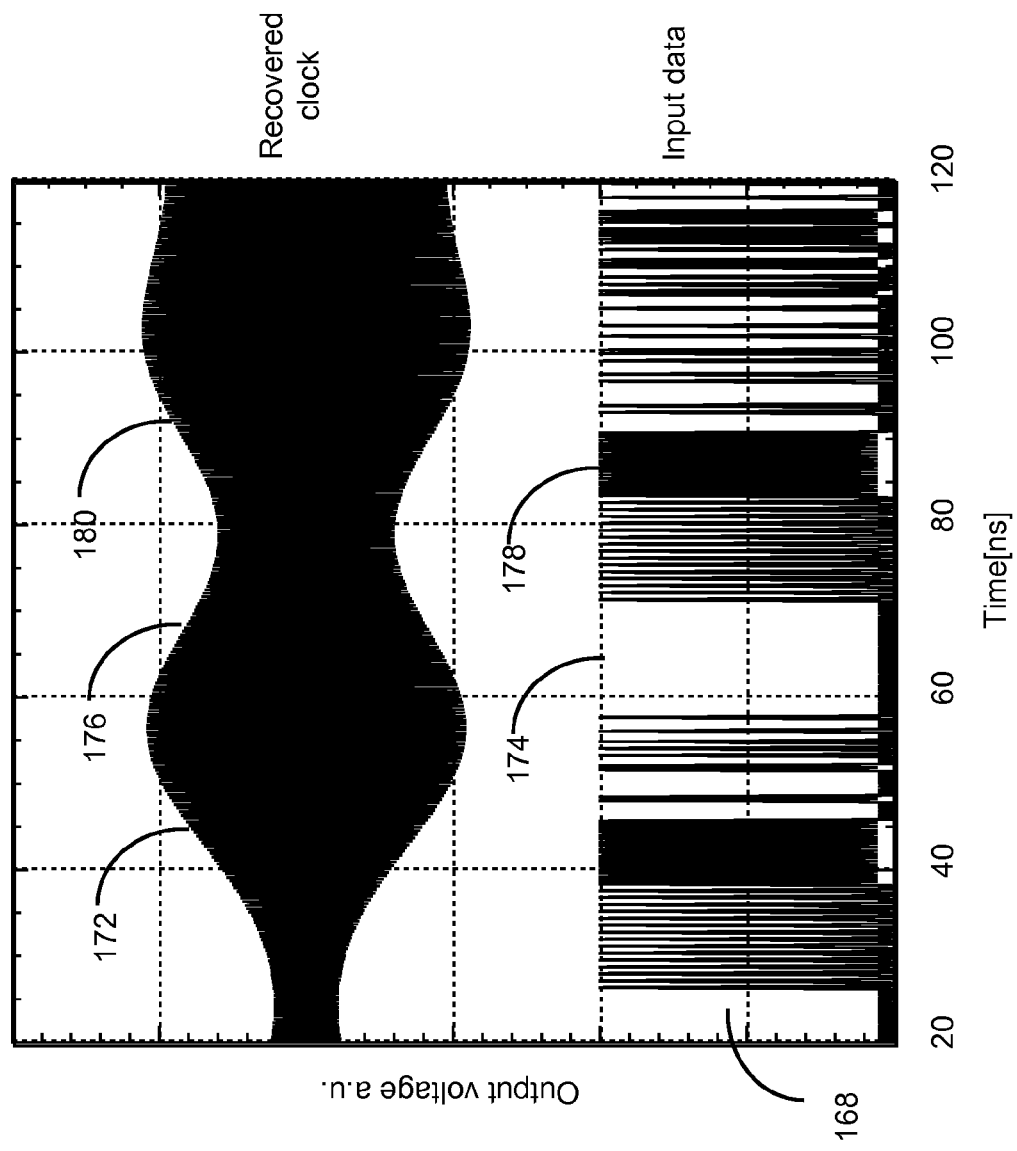
FIG. 6 illustrates power fluctuations in a recovered clock due to unequal bit transitions per unit time.

FIG. 6 illustrates the issues in fast burst mode clock recoveries and emphasizes the requirement to ensuring enough transitions per unit time are present in an incoming data stream. It shows the recovered clock 192 from the clock extraction circuitry 104 (see FIG. 3) but before entering the clock combining module 108. An incoming packet 168 enters the CDR after an amount of time where no data has been present. This causes the clock extraction circuit 104 to charge and lock onto the frequency and phase of the incoming data packet 168. This frequency and phase lock on has a certain rise time 172. The amplitude of the recovered clock is dependent on the number of transitions per unit time in the incoming signal and when a longer string of 0 data 174 is encountered, the amplitude of the output clock decreases 176. The amplitude will increase 180 again when the amount of transitions per unit time also increases 178 again.

Referring again to FIG. 2, no data is present at the input of the CDR during the interpacket gap 182. After the interpacket gap 182, a packet 184 enters the CDR and during its duration data is present at the input of the CDR. At the end of the packet, another interpacket gap 186 exists and no data is again present at the input of the CDR.

During the interpacket gap, the internal CDR local clock 188 is dominant and is output from the CDR. When the packet 184 enters the CDR a transition phase 190 from the local clock 188 to the recovered clock 192 is seen. This is a smooth transition in both phase and frequency. After the transition phase 190, the synthesized clock 191 output from the CDR is the recovered clock 192 from the incoming packet 184. This clock 192 lasts until the end of the incoming packet 184. A new interpacket gap 186 is encountered and the clock output from the CDR enters the transition 194 phase from the recovered clock 192 to the local clock 188. This is a smooth transition in both phase and frequency. After the transition phase 194, the CDR clock output 191 is from the local clock 188.

The use of burst mode transmission as described above can have many advantages. For example, the approach described above can operate with low clock and data recovery overhead (low number of preamble bits). Another aspect is the ability to handle a large dynamic range of input optical power from the fiber.

The burst mode recovery can also operate with fast clock locking time that meets or exceeds most current specifications (e.g. GPON 100 bit preamble). It also has the flexibility to satisfy future burst mode and packet transport and dynamic circuit switched networks, including both framed and unframed transmission protocols.

Another advantage in some implementations is that it comprises burst mode clock and data recovery on both the electrical client-side and on the optical line-side so that only data is communicated between the transceiver module and the optical fiber, and between the module and the client.

In another aspect, burst mode operation can be interfaced with rapid or dynamic tuning functions in time or wavelength by changing the temporal addressing or wavelength on a burst by burst basis.

Burst mode transceivers can also be manufactured in compact packages such as pluggables, board mounted packages or small form factor circuit cards.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. For example, the principles described with respect to the transceiver above may also be applied to transponders.

In alternate embodiments, the invention is implemented in hardware (including FPGAs and ASICs), firmware, software, and/or combinations thereof. The term "module" is not meant to be limited to a specific physical form. Depending on the specific application, modules can be implemented as hardware, firmware, software, and/or combinations of these. In the examples described above, the modules were largely implemented as dedicated circuitry (e.g., part of an ASIC), in order to take advantage of lower power consumption and higher speed. In other applications, the modules can be implemented as software, typically running on digital signal processors or even general-purpose processors. Various combinations can also be used. Furthermore, different modules can share common components or even be implemented by the same components. There may or may not be a clear boundary between different modules.

Depending on the form of the modules, the "coupling" between modules may also take different forms. Dedicated circuitry can be coupled to each other by hardwiring or by accessing a common register or memory location, for example. Software "coupling" can occur by any number of ways to pass information between software components (or between software and hardware, if that is the case). The term "coupling" is meant to include all of these and is not meant to be limited to a hardwired permanent connection between two components. In addition, there may be intervening elements. For example, when two elements are described as being coupled to each other, this does not imply that the elements are directly coupled to each other nor does it preclude the use of other elements between the two.

What is claimed is:

1. A programmable optical subassembly or module comprising:
   application specific optoelectronics for receiving and transmitting optical data;
   control circuitry comprising a field programmable gate array (FPGA) centric programmable element in communication with the application specific optoelectronics for transmitting and receiving fiber optical data, and an electrical client side,
   wherein the control circuitry is configured to control and monitor the transmitting and receiving of the fiber optical data, the control circuitry being a common engine to implement one or more optical transport protocols and one or more communications applications, and
   wherein the control circuitry further comprises a clock and data recovery (CDR) module configured to:
   recover a clock from an incoming data transmission; and
   combine the recovered clock and a local clock into a synthesized clock that can be used to time processing of the incoming data transmission,
   wherein the combining of the recovered clock and the local clock includes:
   selecting primarily the recovered clock when the recovered clock is available; and
   selecting primarily the local clock when the recovered clock is not available.

2. The programmable optical subassembly or module according to claim 1, wherein the control circuitry further comprises circuitry to transmit and receive data in both burst and non-burst mode operations.

3. The programmable optical subassembly or module according to claim 1, wherein the control circuitry further comprises an electrical laser driver and tuning section.

4. The programmable optical subassembly or module according to claim 3, wherein the electrical laser driver and tuning section supports the drive of one or more lasers for both burst mode and continuous non-burst mode operations.

5. The programmable optical subassembly or module according to claim 1, wherein the CDR module is further configured to extract clock and data to receive and transmit data for both burst mode and continuous non-burst mode operations.

6. The programmable optical subassembly or module according to claim 5, wherein
   the CDR module is further configured to make smooth transitions between the recovered clock and the local clock.

7. A field programmable gate array (FPGA) centric optical communication subassembly for use in an optical module, the FPGA centric optical communication subassembly comprising:

application specific optoelectronics for receiving and transmitting optical data; and control circuitry comprising an FPGA in communication with the application specific optoelectronics, the control circuitry comprising functionality such that the monitoring, communications and control of optical module functions are implemented in the FPGA and support circuitry within the optical module, wherein the control circuitry is configured to:

recover a clock from an incoming data transmission, and combine the recovered clock and a local clock into a synthesized clock that can be used to time processing of the incoming data transmission, the combining of the recovered clock and the local clock being comprising selecting primarily the recovered clock when the recovered clock is available, and the local clock when the recovered clock is not available.

8. The FPGA centric optical communication subassembly according to claim 7, wherein the FPGA is configured to implement one or more different transport protocols or different communication applications.

9. The FPGA centric optical communication subassembly according to claim 7, wherein the one or more different transport protocols include burst mode protocols.

10. The FPGA centric optical communication subassembly according to claim 7, wherein the optical module comprises a receiver, transmitter, transceiver or transponder.

11. The FPGA centric optical communication subassembly according to claim 7, wherein the optical module comprises a pluggable module or a board mountable component.

12. The FPGA centric optical communication subassembly according to claim 7, wherein the optical module comprises a pluggable transceiver.

13. The FPGA centric optical communication subassembly according to claim 7, wherein the control circuitry is configured to make smooth transitions between the recovered clock and the local clock.

14. The FPGA centric optical communication subassembly according to claim 7, wherein the control circuitry is further configured to transmit and receive data in both burst and non-burst mode operations.

15. The FPGA centric optical communication subassembly according to claim 7, wherein the control circuitry further comprises a clock and data recovery module configured to extract clock and data to receive and transmit data for both burst mode and continuous non-burst mode operations.

* * * * *